United States Patent [19]

Suh et al.

[11] Patent Number: 5,524,582
[45] Date of Patent: Jun. 11, 1996

[54] TWO-PHASE FUEL EMISSION SYSTEM FOR SPARK IGNITED ENGINE

[75] Inventors: Chung M. Suh; Jeong J. Park, both of Farmington Hills, Mich.

[73] Assignee: Kia Motors Corporation, Seoul, Rep. of Korea

[21] Appl. No.: 386,311

[22] Filed: Feb. 8, 1995

[51] Int. Cl.[6] ........................................ F02B 1/00
[52] U.S. Cl. .................. 123/179.8; 123/179.15; 123/525; 123/576; 123/578
[58] Field of Search ........................ 123/525, 578, 123/520, 576, 179.7, 179.8, 179.14, 179.15

[56] References Cited

U.S. PATENT DOCUMENTS

| | | | |
|---|---|---|---|
| 3,799,125 | 3/1974 | Hutchinson | 123/578 |
| 3,854,463 | 12/1974 | Burden, Sr. | 123/525 |
| 3,933,130 | 1/1976 | Csciscry | 123/179.7 |
| 4,522,158 | 6/1985 | Wisegerber | 123/525 |
| 4,606,319 | 8/1986 | Silva | 123/525 |
| 4,878,475 | 11/1989 | Birsa | 123/525 |
| 5,095,866 | 3/1992 | Burke | 123/179.8 |
| 5,275,145 | 1/1994 | Tuckey | 123/525 |
| 5,337,722 | 8/1994 | Kurihara et al. | 123/527 |
| 5,357,908 | 10/1994 | Sung et al. | 123/576 |

FOREIGN PATENT DOCUMENTS 2491550  4/1982  France .................. 123/525

*Primary Examiner*—Erick R. Solis
*Attorney, Agent, or Firm*—Bielen, Peterson & Lampe

[57] ABSTRACT

An internal combustion engine having a pollution control system with a catalytic converter using a two-phase fuel system in which a small supply of flammable gaseous fuel is used for ignition and initial start-up of the engine. As the engine is warmed up and the catalytic converter is heated, the gaseous fuel is phased out and the liquid fuel is phased in.

8 Claims, 1 Drawing Sheet

THE FUEL SUPPLY SCHEDULE

THE FUEL SUPPLY SCHEDULE

TWO-PHASE FUEL EMISSION SYSTEM FOR SPARK IGNITED ENGINE

BACKGROUND OF THE INVENTION

This invention relates to an internal combustion engine, and in particular, to a two-phase fuel system and method for reducing undesirable emissions.

Engine technologies have advanced to the point that a properly tuned engine will operate with minimal emissions. When an engine is utilized for automotive transportation, the variations in operating conditions and power requirements require various compromises to achieve both fuel efficiency and low emissions. Where an engine is operating under less than optimum conditions, various scavenging and recirculating systems are utilized to complete the combustion process of partially burned fuel. Ultimately, discharged exhaust gases must pass through a catalytic converter where any remaining hydrocarbons that have not been previously combusted are oxidized before final discharge to the atmosphere.

The part of an engine operating cycle that generates a substantial quantity of undesirable emissions is the period of start-up. During an engine start-up, particularly a cold start-up, the gas scavenging systems and thermal conditions that are designed for optimum operation are not yet functioning. A cold catalytic converter is ineffective in eliminating unburned hydrocarbons that pass through the exhaust system. In aspirated liquid fuel engines, cold liquid fuel is sprayed into the combustion chamber intake, wherein several cycles may occur prior to ignition and start-up. Once started, the excess fuel introduced to initiate start-up may burn incompletely and at reduced temperatures in the cold block so that high rate hydrocarbon gases are generated. Furthermore, after ignition and before completion of a warm-up period, a rich fuel mixture is provided to improve the fuel flammability. This further contributes to excessive undesirable emissions during the period of start-up. During the start-up period, the cold catalatic converter is incapable of finally combusting the start-up gases that are exhausted in the initial phases of engine operation. Before the catalytic converter is heated sufficiently to activate the final oxidation of hydrocarbon exhaust gases. The unburned gases pass to the atmosphere.

The two-phase fuel system of this invention addresses the problem of engine pollution during start-up and incorporates an auxiliary fuel subsystem for supplying and delivering a gaseous fuel to the engine during the critical period of engine start-up. Once the engine is started, and the engine approaches a sufficient temperature that emissions from combustion of liquid fuel can be controlled, the supply of gaseous fuel is phased out, and the supply of liquid fuel is concurrently phased in. In this manner, any fuel that escapes the activated scavenging systems of the engine, are eliminated by the now heated and functioning catalatic converter.

Since the storage of a gaseous fuel, even in liquified form requires significant auxiliary space, it is preferred that the phase of engine start-up that utilize gaseous fuel be minimized. It is preferred that the use of gaseous fuel during engine start-up be supplemented by gassified liquid fuel drawn from the liquid fuel tank. This feature extends the useful term of a gaseous fuel storage canister and/or reduces the size of the canister required for a desired number of cold-engine starts.

The two-phase fuel system of this invention can be incorporated in new engine systems or added as a retro-fit to existing engine systems.

SUMMARY OF THE INVENTION

The two-phase fuel system of this invention utilizes an auxiliary gaseous fuel for engine start-up. It is during this phase of engine operation that undesirable products of incomplete combustion of liquid fuel are passed to the atmosphere at the greatest rate. It is a primary object of this invention to eliminate pollution during start-up and provide a clean burning gaseous fuel to the engine during the initial period of start-up. Since the gaseous fuel itself is clean burning, the complex system of emission control including the catalytic converter that is not yet activated during start-up is unnecessary to avoid generation of polluting emissions. To improve the longevity of the auxiliary supply of gaseous fuel, the two-phase fuel system supplements the delivery of gaseous fuel from the auxiliary fuel supply with gasoline vapors drawn from the air chamber of the liquid fuel supply. Gradually liquid fuel is phased in from the liquid fuel supply, while phasing out the gaseous fuel from the auxiliary fuel supply.

In this manner, the space requirements for storage of gaseous fuel can be minimized. Typically, any common, clean burning gaseous fuel or fuel mixture, including methane, ethane, propane, butane or natural gas, is appropriate for initiating the pollution free combustion process.

Preferably, the gaseous fuel is supplied in pre-filled replaceable, canisters or pressurized cylinders. The term "gaseous fuel" is used to differentiate from conventional liquid gasoline. The gaseous fuel is in the form of a gas or vapor at atmospheric pressure and may be liquified under pressure when stored in the canister or cylinder.

The term, "gasoline vapor" or "liquid fuel vapor" is used to identify the combustible vapors generated in the normal fuel tank for the engine. The vapors typically accumulate in the air chamber portion of the fuel tank, that is, in the volume not occupied by the liquid fuel.

A preferred sequence of operation during engine start-up is to initiate combustion with a fuel-air mixture in which the fuel component comes totally from the gaseous fuel supply. Upon ignition and generation of a vacuum in the intake plenum, gasoline vapors are drawn from the liquid fuel tank to supplement the gaseous fuel supply. As the proportion of air drawn from the gasoline tank increases with respect to the diminishing gasoline vapors, delivery of liquid fuel through the normal fuel delivery system is initiated. The gaseous fuel delivery is phased out as the liquid fuel is phased in. The process takes no more than a minute or two and the gaseous fuel supply is discontinued when the various vacuum and thermal controls become activated and the catalytic converter is heated by the exhaust gases and becomes operational.

To monitor and control the two-phase fuel delivery system, an electronic control unit is utilized. The electronic control unit is of a conventional type used to control operation of a typical modern automotive engine. The electronic control unit contains a programmed reference map of operation and responds to sensor signals with control signals. In the system described, upon initiating ignition, the conventional fuel system is temporarily disabled and the auxiliary gaseous fuel delivery system enabled, so long as there remains sufficient fuel in the auxiliary system. As an intake vacuum is generated, the fuel-air ratio of the start-up mixture is leaned out, and fuel vapors from the gasoline storage tank are introduced to supplement the diminishing supply of gaseous fuel from the auxiliary fuel canister. Finally, as the fuel vapors drawn from the gasoline storage tank begin to carry greater quantities of air, again leaningout the composite fuel-air mixture, the electronic control module activates the native fuel supply system and gradually increases the supply of liquid fuel as the gaseous fuel and fuel vapor supply is phased-out and the auxiliary system deactivated until the next start. Where the start is not a cold start, the duration of the phased sequencing can be substantially diminished in accordance with sensed thermal conditions transmitted to the electronic control module.

Since the two-phase fuel system is designed only for engine start-up, no major changes in the design of the engine are required for continuous operation as required in the design of a dual-fuel engine.

These and other features will become apparent from a consideration of the Detailed Description of the Preferred Embodiments that follows.

DETAILED DESCRIPTION OF THE PREFERRED EMBODIMENTS

Figure 1:
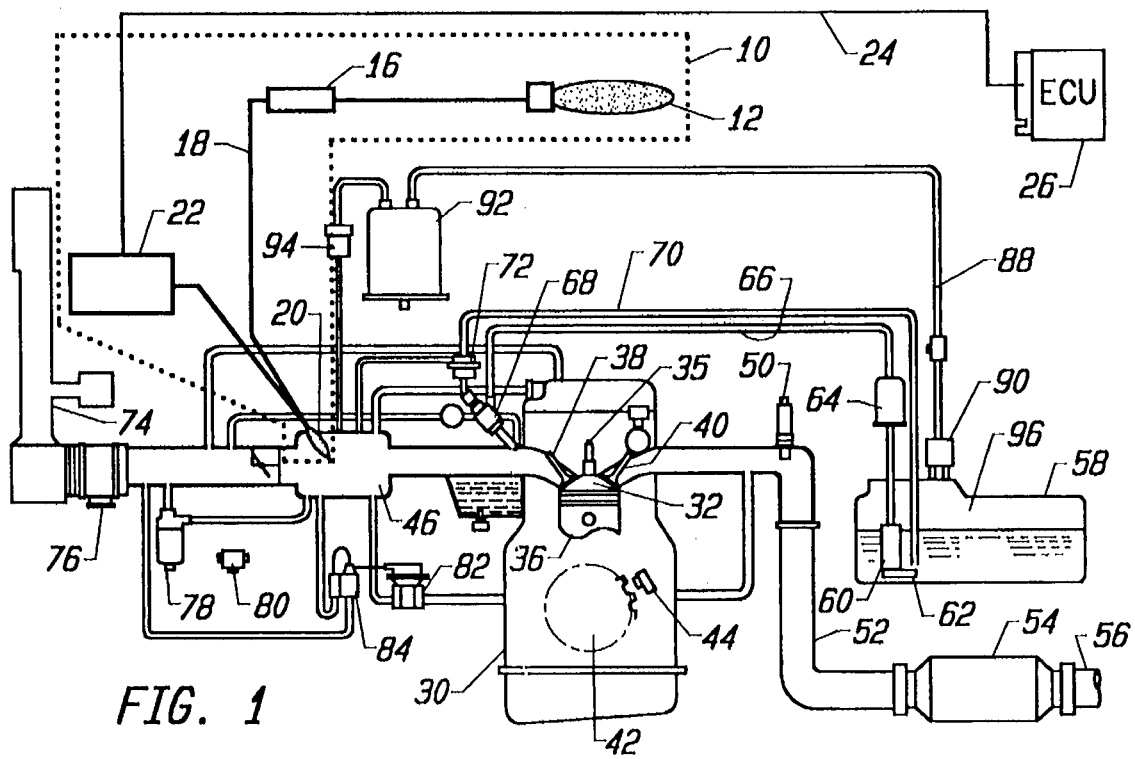
FIG. 1 is a schematic illustration of the engine system with the two-phase fuel system.

The two-phase fuel system of this invention is described in conjunction with a typical modern engine system 8 as shown in FIG. 1. The engine system shown includes various emission controls typically incorporated in engines adapted for automotive use.

Referring to FIG. 1, the components that comprise the auxiliary gaseous ignition system, designated generally by the reference numeral 10, are shown within the dotted perimeter in the schematic illustration of FIG. 1. The gaseous ignition system components 10 include a relatively small compressed gas storage canister or cylinder 12 for storing a supply of gaseous fuel and the necessary components to supply a gaseous fuel to the engine on start-up. The gaseous fuel canister 12 is connected to a compressed gas supply line 14 that includes a pressure controller 16 to regulate the pressure of the gaseous fuel in the fuel delivery portion 18 of the supply line 14 that connects with a compressed gas fuel injector 20. The compressed gas fuel injector 20 is an electronically activated fuel dispenser of conventional design and is controlled by an electronic control circuit 22. The control circuit is electronically connected by circuit line 24 to an electronic control unit 26 that is part of the engine system that monitors and regulates the engine operation. The electronic control unit is programmable and is modified to include an operating regime that provides for sequential operation of the two-phase fuel system herein described.

The engine system 8, includes an engine 28 with a cylinder block 30, at least one combustion chamber 32 and a cylinder head 34 with a spark plug 35. A piston 36 and intake and exhaust valves, 38 and 40, for each combustion chamber are schematically illustrated in the cylinder block 30. Additionally, a fly wheel 42 is schematically shown with an engine speed sensor 44 that is electronically connected to the electronic control unit 26. It is to be understood that the electronic sensors and control systems of the engine system 8 shown, are conventional and are herein illustrated, as typical control systems for minimizing emissions.

The engine system 8 includes an intake plenum 48 with a connecting passage to the intake valve 38 and combustion chamber 32 and exhaust manifold 50 with a connecting passage from the combustion chamber through the exhaust valve 40. The exhaust manifold 50 has an oxygen sensor 50 that is electronically connected to the electronic control unit 26 to monitor the oxygen content of the combustion products before emission through an exhaust pipe 52, catalytic converter 54 and tail pipe 56.

Fuel for the engine is primarily supplied from a conventional gas tank 58 which contains a liquid fuel, typically gasoline. A fuel pump 60 in the fuel tank 58 draws liquid fuel through a low pressure filter 62 and pumps it through a high pressure line filter 64 to supply fuel filtered through a fuel line 66 that is connected to a fuel injector 68. A fuel return line 70 regulated by pressure regulator 72 returns fuel from the fuel injector to the fuel tank 58. Preferably, the fuel injector is electronically controlled to allow direct activation of the fuel injector in phasing in the supply of liquid fuel during start-up. Alternately, electronic control of the fuel pump or pressure regulator is required for phased operation.

Air for the combustion process is supplied through an air filter 74 through air flow meter 76 to the intake plenum 46. An idle speed actuator 78 and throttle position sensor 78 monitor and regulate the operating conditions of the engine.

An exhaust gas return valve 82 and an exhaust gas control valve 84 together with a positive crankcase ventilation valve 86 provide for partial scavenging of emission pollutants. Additionally, a fuel vapor line 88 protected by a liquid vapor separator 90 connects to the intake plenum 46. The vapor line 88 includes a charcoal canister 92 for particle filtration and a canister purge control valve 94 for evacuating gasoline vapors in the air chamber region 96 of the fuel tank 58. Additional sensors typical of a modern engine system including a coolant temperature sensor 98 provide data signals to the electronic control module 26 for analysis to determine the engine state upon start-up. For example, whether a cold start or hot restart is involved, which would affect the duration of the gaseous fuel phase on start-up, is easily determined by the coolant temperature.

Since the gaseous fuel is only used during start-up, the size of the supply canister is desired to be minimized. To extend the life of the auxiliary fuel supply the quantity used during start-up is conserved. As mentioned, the duration of the gaseous fuel supply on a cold start is programmed to be longer than for restart of a warmed-up engine where the scavenging systems and catalytic converter more immediately begin functioning.

As an additional means of conserving gaseous fuel, the gasoline vapors in the fuel tank 58 are drawn to the plenum 46 by the vacuum created in the plenum 46 by the cycling of the engine, particularly after ignition.

Figure 2:
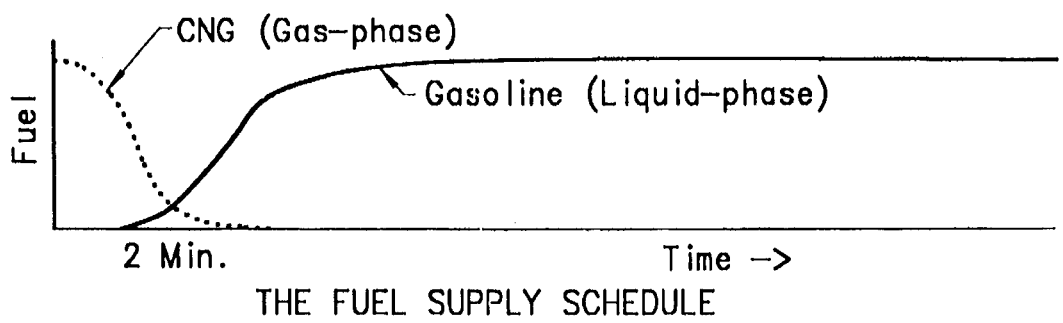
FIG. 2 is a diagram of a fuel supply schedule for a first embodiment of the two-phase fuel system.
Figure 3:
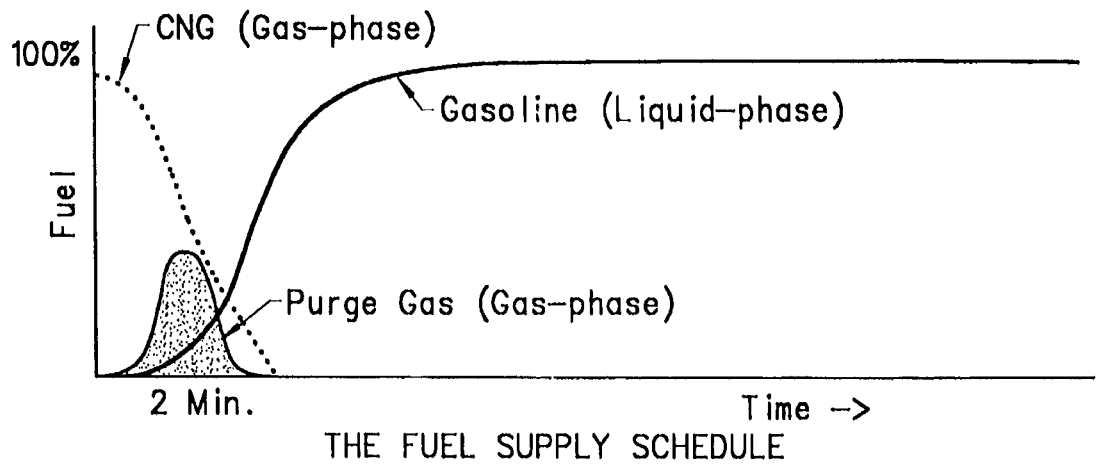
FIG. 3 is a diagram of fuel supply schedule for a second embodiment of the two-phase fuel system.

Referring to FIGS. 2 and 3, the operation of the two-phase fuel system is diagrammatically shown. In the system of FIG. 2, a fuel quantity-time line is shown with one hundred percent of the fuel being supplied from the auxiliary gaseous fuel supply at the time of initial start-up. After ignition, the gaseous fuel supply is gradually diminished and the liquid fuel from the existing gasoline supply is phased-in. During warm-up, there is a period in which both gaseous fuel and liquid fuel are concurrently supplied to the engine, prior to phasing out the gaseous fuel supply and full reliance on the phased-in liquid fuel supply. Where a warm start or hot start is initiated, the time-line is compressed and the phasing out of the gaseous fuel supply and phasing-in of the liquid fuel supply occurs more rapidly than the extended time frame shown in FIG. 2. Since the gaseous fuel produces acceptably low polluting emissions, the two-phase system relies on combustion of the gaseous fuel until at least the time that the catalytic converter is heated and operational. At this time, the other thermal controls for more efficient vaporization of the liquid fuel and scavenging of unburned hydrocarbons become increasingly effective. The new result is a clean burning engine from start-up.

Referring now to FIG. 3, the two-phase fuel system incorporates the gasoline vapor recovery circuit incorporated in most modern engines. This circuit, in the configuration shown in FIG. 1, includes the fuel vapor line 88, with the separator 90, charcoal canister 92 and canister purge control valve 94. In this system, the fuel supply schedule again provides for one hundred percent of the fuel to be supplied from the gaseous fuel supply during initial start-up. As ignition cycles the engine and generates a vacuum in the plenum 46, the gasoline vapors in the fuel tank are drawn into the plenum to mix with the gaseous fuel and supplement the diminishing supply of gaseous fuel. At this stage, the system is still operating in a gaseous phase of the start-up cycle. As the gaseous fuel from the gaseous fuel supply undergoes a controlled reduction, the liquid fuel is phased-in and reaches a significant level after the supply of gasoline vapors has peaked. The gaseous fuel is finally phased out and the liquid fuel remains as the sole fuel source after the warm-up period. Again, the gaseous fuel and the combined gaseous fuel and gaseous vapors from the gasoline tank are efficiently combusted with minimum pollution allowing the engine system to warm and the pollution control components to become operational before the liquid fuel is fully phased in.

The auxiliary gaseous fuel system comprises an inexpensive method of controlling pollution during the initial phase of engine start-up by the clean burning characteristics of the fuel. By mixing the gaseous fuel with fuel vapors from the gasoline tank, the clean burning gaseous phase can be maintained and the life of a gaseous fuel supply extended.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A method of reducing polluting emissions in an internal combustion engine during warm-up, wherein the internal combustion engine is fueled by a supply of liquid fuel during operation after warm-up comprising the steps of:

a) providing an auxiliary supply of a clean burning gaseous fuel;

b) exclusively supplying the gaseous fuel to the engine on engine start-up, so that the gaseous fuel comprises all of the fuel during start-up;

c) phasing in the supply of liquid fuel after engine start-up and during warm-up wherein both gaseous fuel and liquid fuel are supplied to the engine;

d) concurrent with the phasing in of liquid fuel after engine start-up and during warm-up, phasing out the supply of gaseous fuel to the engine.

2. The method of claim 1 wherein the step of providing a supply of a clean burning gaseous fuel includes providing a canister of gaseous fuel under pressure with means for regulating the pressure of gaseous fuel supplied to the engine.

3. The method of claim 2 wherein the step of providing a supply of clean burning gaseous fuel includes providing a gaseous fuel injector for injecting a gaseous fuel into the engine.

4. The method of claim 3 wherein the step of providing a supply of a clean burning gaseous fuel includes control means for phasing out the gaseous fuel supply after ignition.

5. The method of claim 1 wherein the step of providing a supply of a clean burning gaseous fuel includes the added step of supplying gasoline vapors from the liquid fuel supply in addition to the supply of a clean burning gaseous fuel.

6. The method of claim 5 wherein the engine includes a gasoline vapor purge circuit and the step of supplying gasoline vapors utilizes the gasoline vapor purge circuit of the engine.

7. In an internal combustion engine having a combustion chamber and a liquid fuel supply for operation of the engine and a pollution control system including a catalytic converter for controlling polluting emissions from the engine, a secondary fuel system for use during engine start-up and warm-up comprising:

a small supply of gaseous fuel, and a fuel supply control means for supplying gaseous fuel to the engine from the small supply of gaseous fuel during engine start-up, wherein the fuel supply control means includes regulating means for subsequently phasing in a supply of liquid fuel after ignition and during warm-up, and phasing out the gaseous fuel upon heating of the catalytic converter wherein during warm-up both gaseous fuel and liquid fuel are supplied to the engine.

8. The secondary fuel system of claim 7 wherein the fuel supply control means includes thermal sensor means for determining that the catalytic converter is heated and operating, the fuel supply control means completing the phasing out of gaseous fuel on determination that the catalytic converter is heated and operating.

\* \* \* \* \*